(12) United States Patent
Parr (10) Patent No.: US 9,182,044 B1
(45) Date of Patent: Nov. 10, 2015

(54) TANK VALVE

(71) Applicant: Tim Parr, Arapaho, OK (US)

(72) Inventor: Tim Parr, Arapaho, OK (US)

(73) Assignee: Tim Parr, Arapaho, OK (US)

( * ) Notice: Subject to any disclaimer, the term of this patent is extended or adjusted under 35 U.S.C. 154(b) by 131 days.

(21) Appl. No.: 13/888,361

(22) Filed: May 6, 2013

Related U.S. Application Data (60) Provisional application No. 61/642,482, filed on May 4, 2012.

(51) Int. Cl.
| F16K 15/00 | (2006.01) |
| F16K 5/00 | (2006.01) |
| F16K 1/22 | (2006.01) |
| F16K 5/22 | (2006.01) |
| B67D 7/36 | (2010.01) |
| F16K 27/07 | (2006.01) |
| F16K 27/06 | (2006.01) |

(52) U.S. Cl.
CPC . *F16K 5/222* (2013.01); *B67D 7/36* (2013.01); *F16K 27/062* (2013.01); *F16K 27/07* (2013.01)

(58) Field of Classification Search
CPC ....... F16K 27/07; F16K 27/062; F16K 5/222; Y10T 137/86751
USPC ........ 251/144, 309–312; 137/625.16, 625.31, 137/625.32, 597
See application file for complete search history.

(56) References Cited

U.S. PATENT DOCUMENTS

| 1,296,239 | A | * | 3/1919 | Van Meter ................ 251/144 |
| 1,780,525 | A | * | 11/1930 | Jacobsen .................... 137/241 |
| 2,300,825 | A | | 11/1942 | Bloom et al. |
| 2,365,650 | A | | 12/1944 | Shaw |
| 2,370,040 | A | | 2/1945 | Jackson |
| 4,066,090 | A | | 1/1978 | Nakajima et al. |
| 4,187,881 | A | * | 2/1980 | Kull ........................ 137/625.31 |
| 4,282,895 | A | | 8/1981 | Young |
| 4,318,531 | A | * | 3/1982 | Carlson ........................ 251/144 |
| 4,453,534 | A | | 6/1984 | Kazimir |
| 4,522,219 | A | | 6/1985 | Ohkata |
| 5,033,500 | A | | 7/1991 | Hoeptner, III |
| 6,296,007 | B1 | | 10/2001 | Cifune |
| 7,311,266 | B2 | | 12/2007 | Santry |
| 7,458,388 | B2 | | 12/2008 | Huang |
| 7,770,592 | B2 | | 8/2010 | Knight et al. |
| 8,028,534 | B2 | | 10/2011 | Jenkins, Jr. et al. |
| 8,074,673 | B2 | | 12/2011 | Maisch et al. |
| 2007/0152079 | A1 | | 7/2007 | Santry |
| 2007/0240764 | A1 | | 10/2007 | Huang |
| 2009/0266090 | A1 | | 10/2009 | Jenkins, Jr. et al. |
| 2010/0239928 | A1 | | 9/2010 | Tsuchiya |
| 2012/0006829 | A1 | | 1/2012 | Jenkins, Jr. et al. |

FOREIGN PATENT DOCUMENTS

KR   1020070052176   5/2007

* cited by examiner

*Primary Examiner* — John K Fristoe, Jr.
*Assistant Examiner* — Hailey K Do
(74) *Attorney, Agent, or Firm* — IP Law Leaders, PLLC

(57) ABSTRACT

The invention is directed to a valve system comprising of moving parts therein. The valve system is designed to be resistant to the effects of low temperatures which otherwise tend to compromise the correct operation of the moving parts of the valve system. The inventor has cleverly got around this problem by designing a valve in which the moving parts thereof are positioned inside the contents of a tank. The contents of the tank ensure that the moving parts are less vulnerable to fluctuations in temperature outside the tank. Consequently, the invention provides reliable valve operation during freezing weather.

3 Claims, 12 Drawing Sheets

TANK VALVE

STATEMENT REGARDING FEDERALLY SPONSORED RESEARCH OR DEVELOPMENT

Not Applicable.

FIELD OF THE INVENTION

This invention relates to valves.

BACKGROUND OF THE INVENTION

A valve is typically made up of moving parts that are often susceptible to changes in temperature leading to valve failure. There is a need for a valve system designed to be resistant to the effects of low temperatures which otherwise tend to compromise the correct operation of the moving parts of the valve system.

U.S. Publication Number 20120006829 discloses an improved refrigerator is provided with a freeze tolerant valve for the water tank assembly in the refrigerator. The valve includes a body with an internal plastic spool which minimizes the volume of water within the valve, and which provides a space in the valve to accommodate freezing water in the valve. The valve will not crack or fail in the event of a temperature control problem in the refrigerator which results in frozen water within the valve.

U.S. Pat. No. 2,370,040, which discloses a valve resistant to cold weather (see column 1, lines 40-47). The '040 valve is a tank valve for use in conjunction with storage tanks (col. 1, lines 5-9).

U.S. Pat. No. 4,453,534 discloses a solar water heating system for heating water in a solar panel and storing it in a water storage tank includes a pump which circulates the water in the system, from the water storage tank through the solar panel and back to the water storage tank; a freeze protection means permits water to bleed off from a location between the solar panel and water storage tank when the pump is off to maintain a flow of water through said solar panel and connecting parts thereof which are located in an area where freezing can be encountered. The '534 system provides an automatic freeze protection without the need for electrical power and involves the use of a thermally operated freeze valve 30 which can be set to open as the temperature at that point approaches freezing, say for example, 40° F. to open the valve 30 and permit water to flow therefrom at an outlet 38. When this happens, water from the water storage tank 2 is forced through conduit means 10 (including pump 14), solar panel 20 and a portion of conduit means 22 and outlet 38 of valve 30. However, the '534 patent does not state that the freeze valve 30 has moving parts that are located in storage tank 2.

U.S. Pat. No. 7,311,266 describes a freeze-proof water valve for supplying secondary water under pressure in freezing ambient conditions to a snow making apparatus having primary water spray nozzles and secondary water spray nozzles. The valve housing is provided with an interior primary water chamber with a water inlet and a primary water outlet for continuous passage of primary water under pressure therethrough for delivery to primary water spray nozzles on the snow making apparatus. A valve body is mounted within this valve housing within the primary water chamber for flow of water there-around from the housing inlet to the primary outlet to prevent freeze-up of the valve body when in the off position. The valve body is movable between an on position and an off position whereby water from the primary chamber is directed to a secondary outlet when the valve is in the on position for feeding water to the secondary water spray nozzle or nozzles. Water in the primary chamber is shut off from this secondary outlet and water in this secondary outlet is directed instead to a water drain outlet for discharge when the valve is in the off position.

None of the above inventions and patents, taken either singly or in combination, is seen to describe the instant invention as claimed.

SUMMARY

The invention is directed to a valve system comprising of moving parts therein. The valve system is designed to be resistant to the effects of low temperatures which otherwise tend to compromise the correct operation of the moving parts of the valve system. The inventor has cleverly got around this problem by designing a valve in which the moving parts thereof are positioned inside the contents of a tank. The contents of the tank ensure that the moving parts are less vulnerable to fluctuations in temperature outside the tank. Consequently, the invention provides reliable valve operation during freezing weather.

DESCRIPTION OF THE PREFERRED EMBODIMENTS OF THE INVENTION

Figure 1:
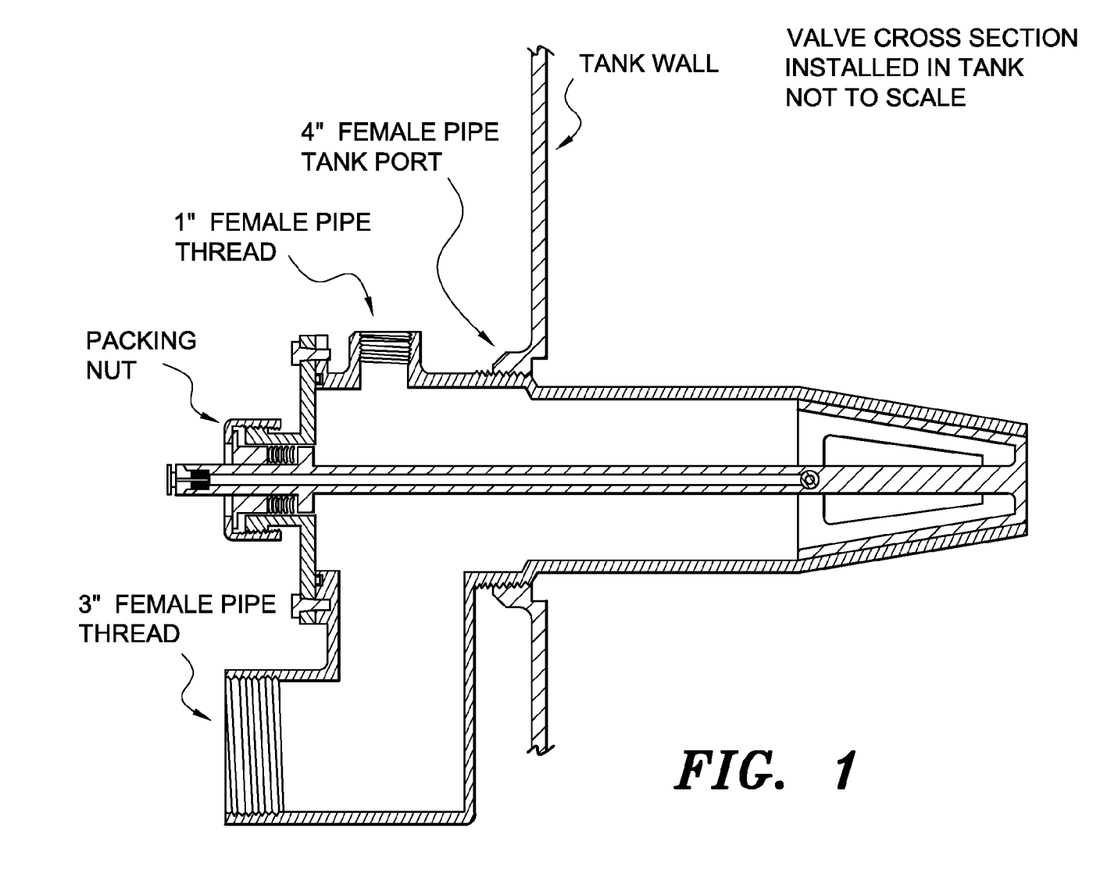
FIG. 1 shows a lengthwise cross-section view of a tank valve according to the invention.
Figure 2:
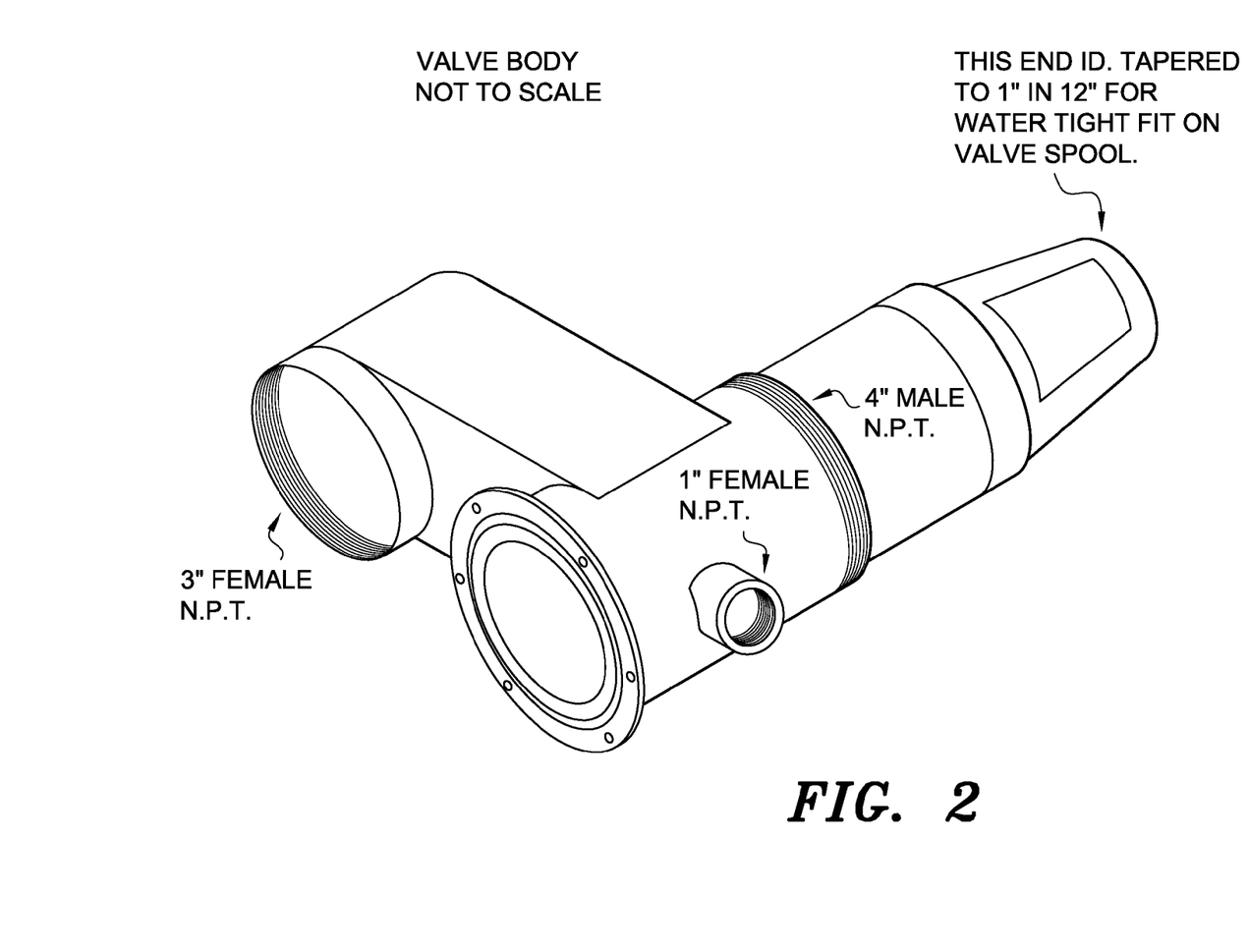
FIG. 2 shows an elevated front perspective diagrammatic view of a tank valve according to the present invention.
Figure 3:
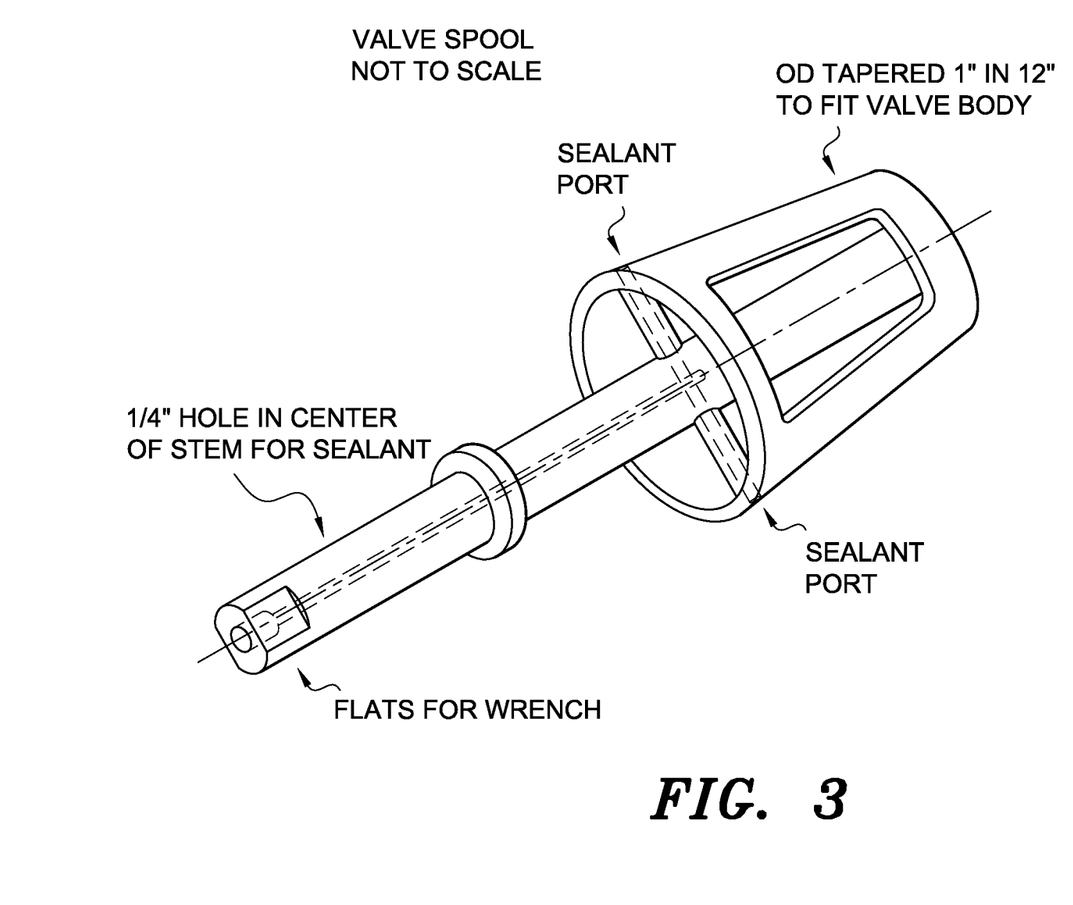
FIG. 3 shows a perspective view of a valve spool according to the present invention.
Figure 4:
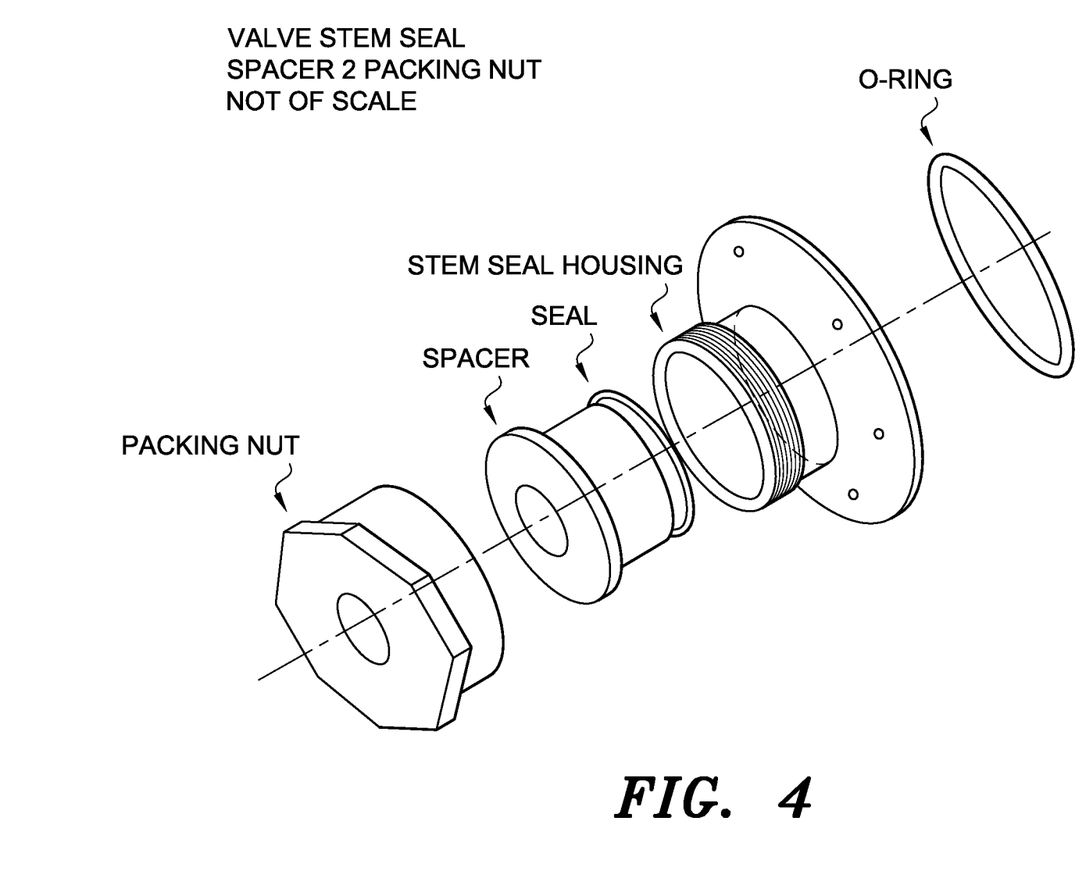
FIG. 4 shows an exploded view of a valve stem seal according to the present invention.
Figure 5:
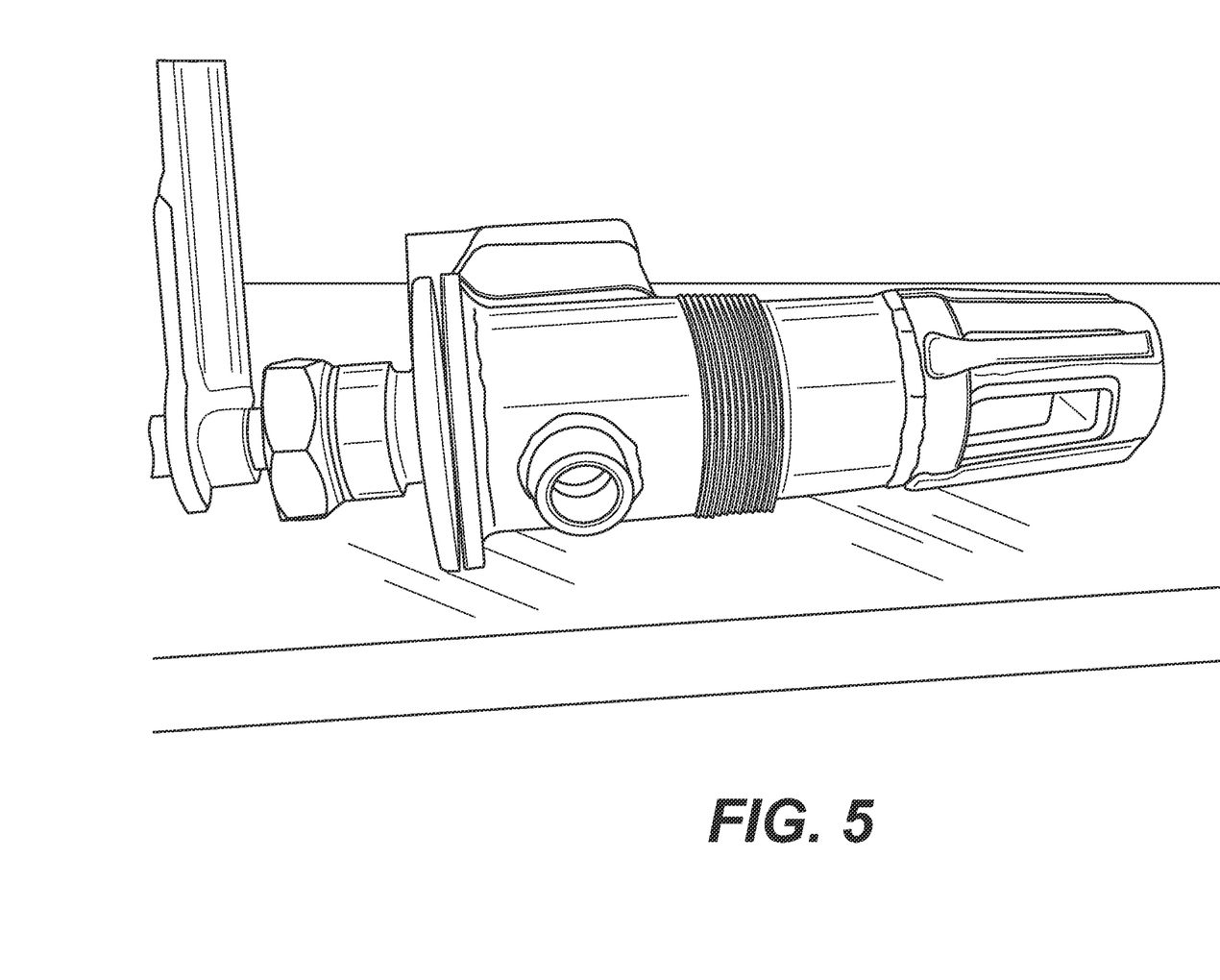
FIG. 5 shows a side view of a tank valve according to the present invention showing a wrench connected to the valve spool.
Figure 6:
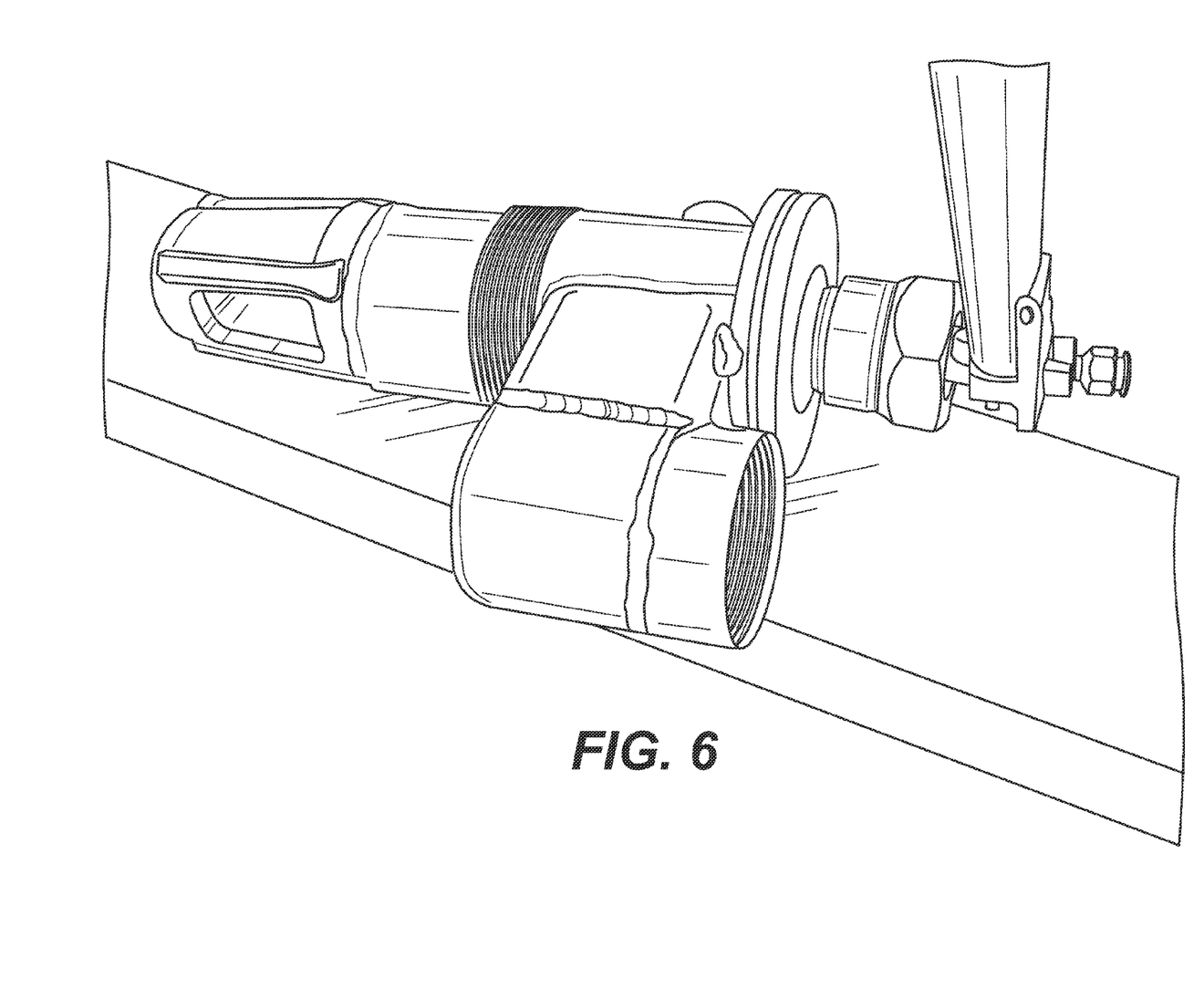
FIG. 6 shows an opposite side view of the tank valve shown in FIG. 5.
Figure 7:
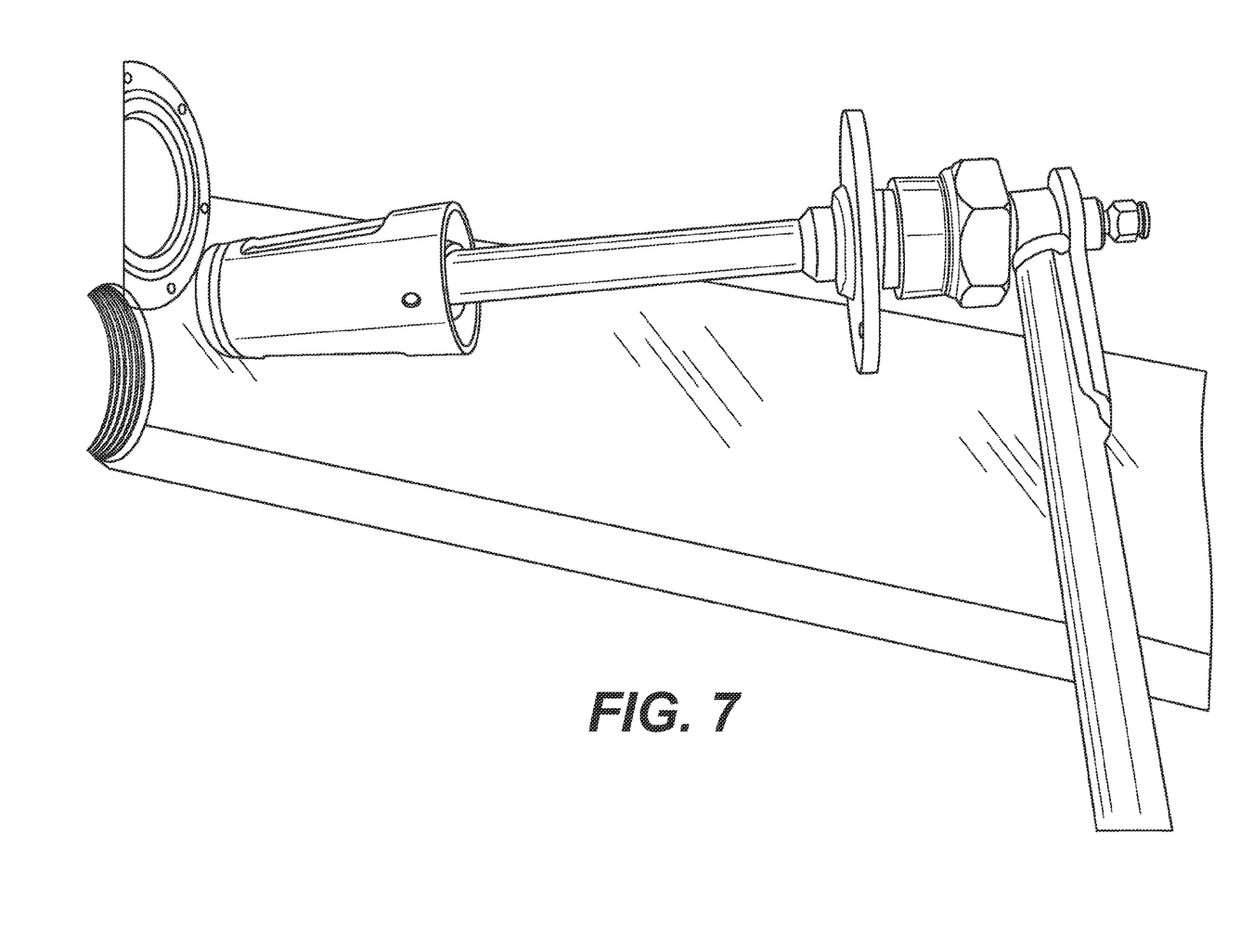
FIG. 7 shows a side view of a valve spool with one end thereof connected to a wrench.
Figure 8:
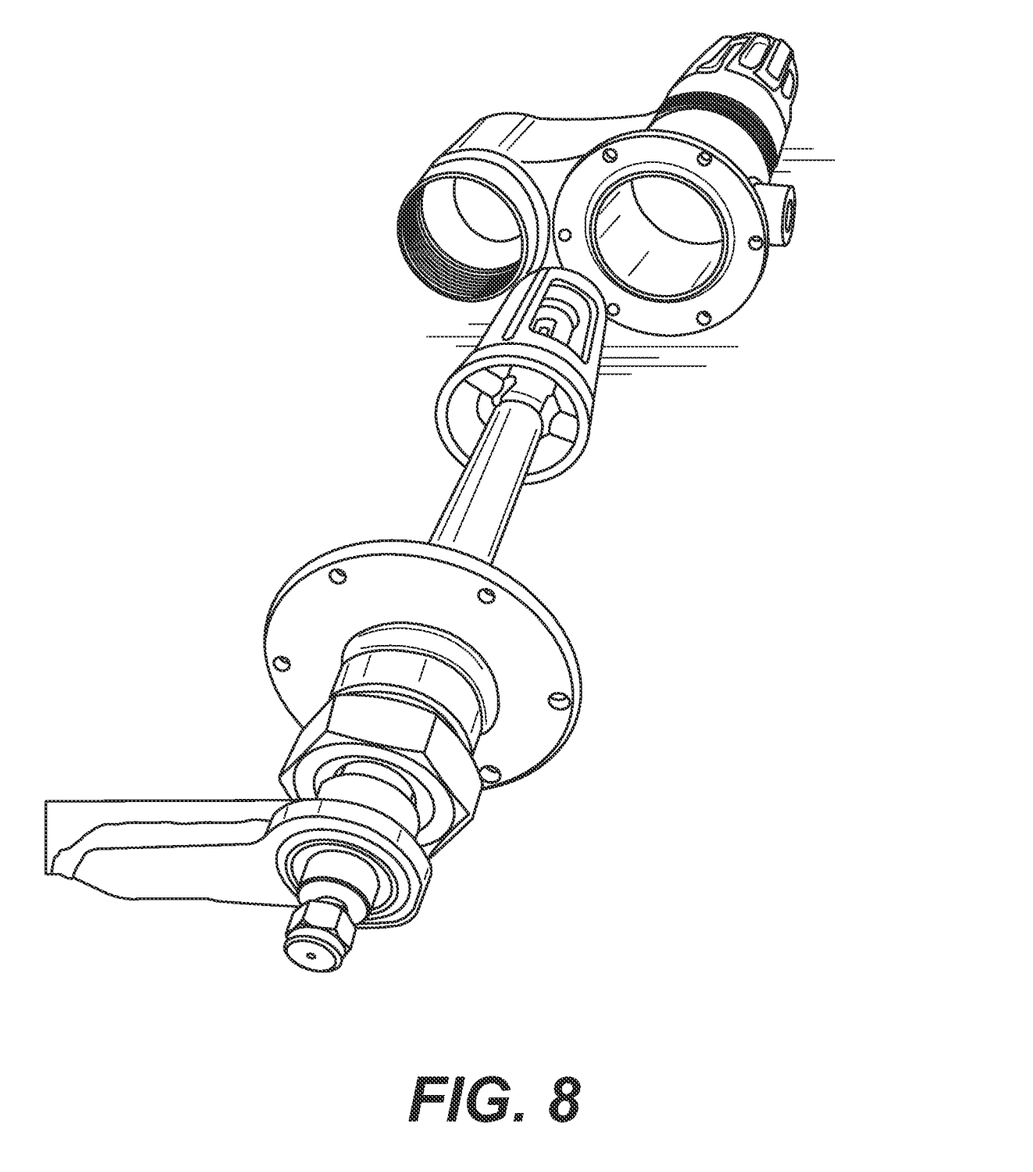
FIG. 8 shows a view of a valve spool removed from a tank valve's housing according to the present invention.
Figure 9:
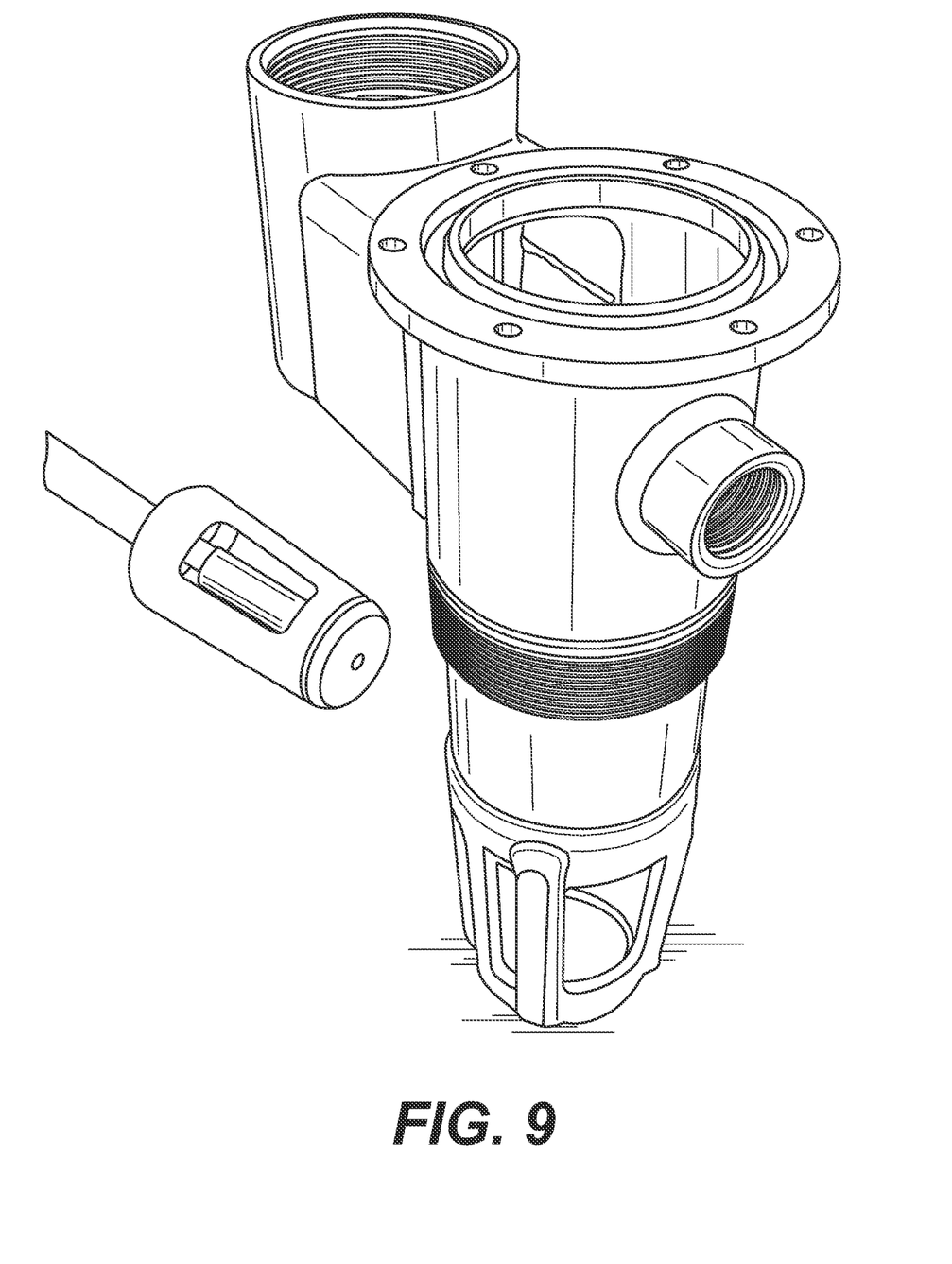
FIG. 9 shows a perspective view of the housing of a tank valve according to the invention.
Figure 10:
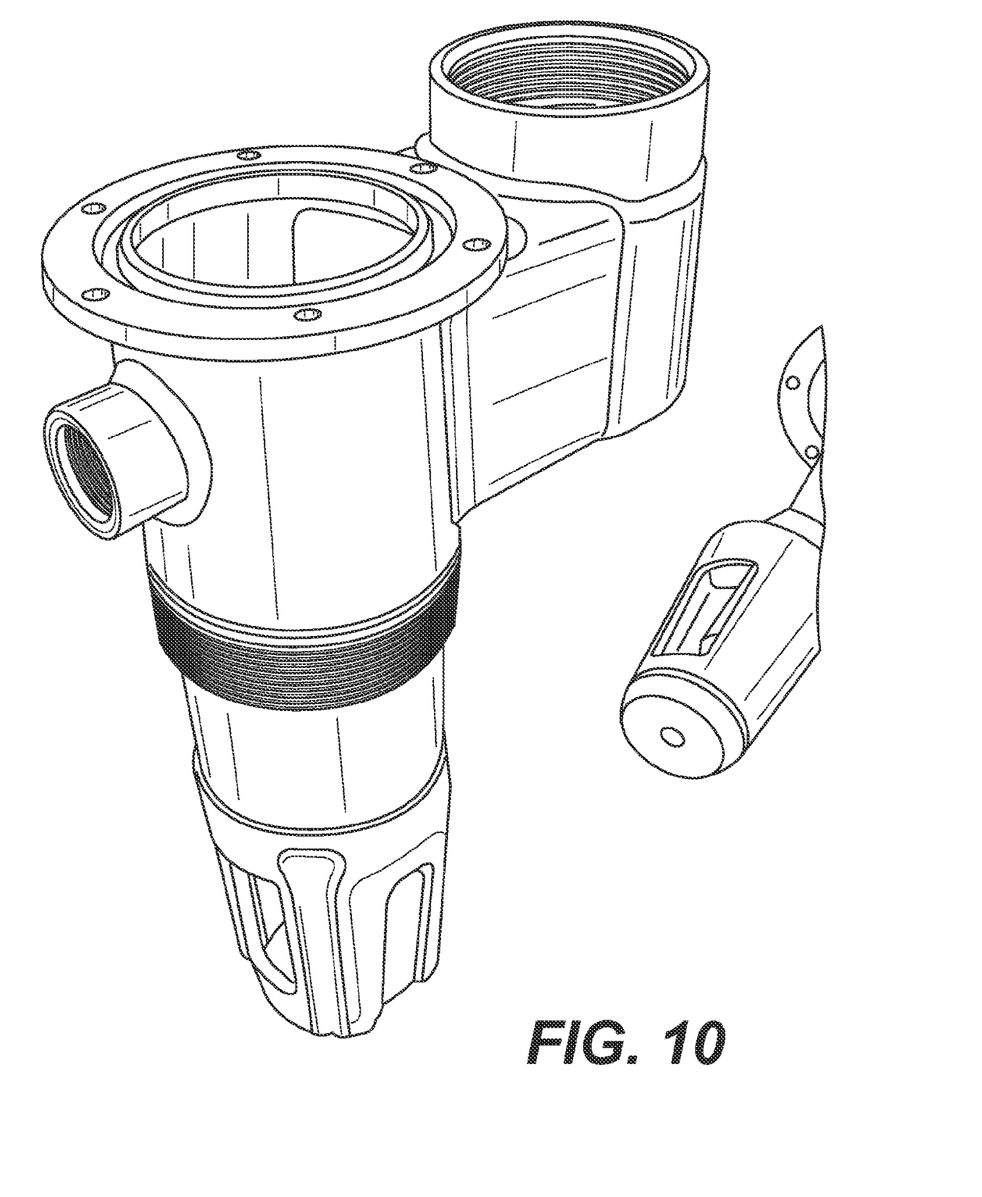
FIG. 10 shows an elevated perspective end view of the housing of a tank valve according to the invention.
Figure 11:
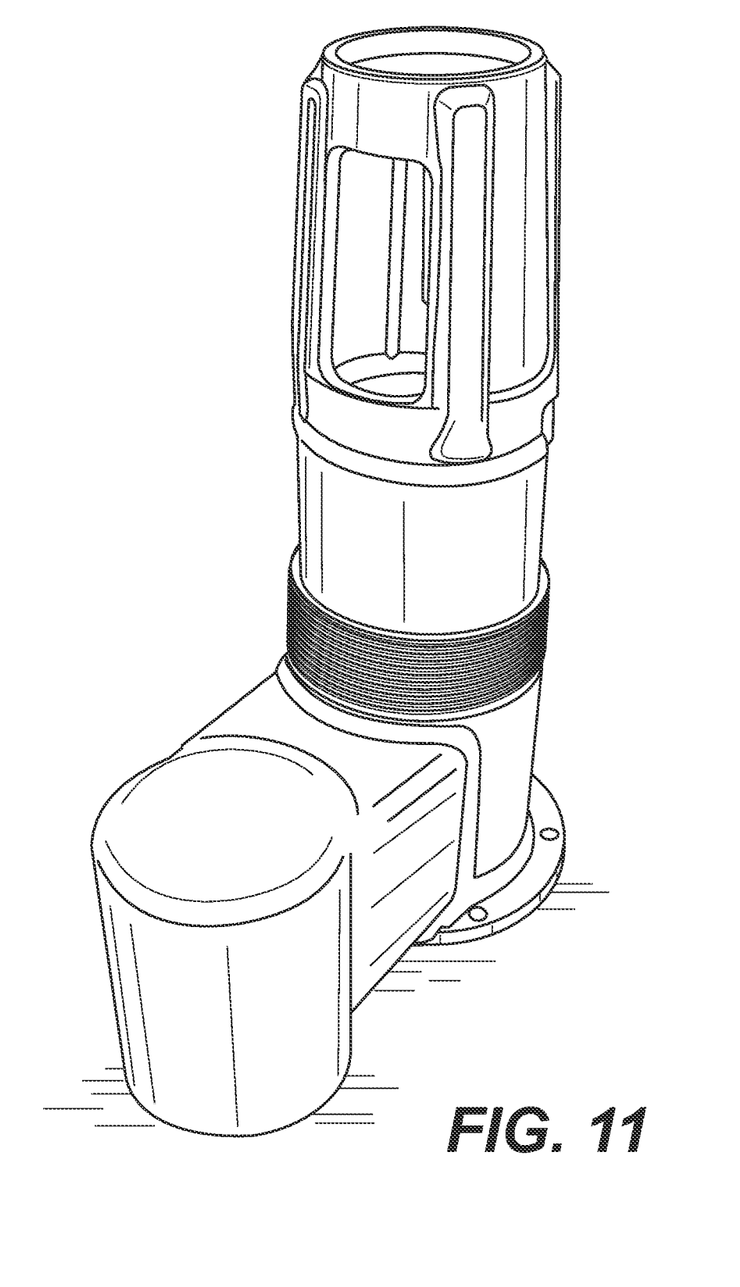
FIG. 11 shows an elevated opposite end view of the housing shown in FIG. 10.
Figure 12:
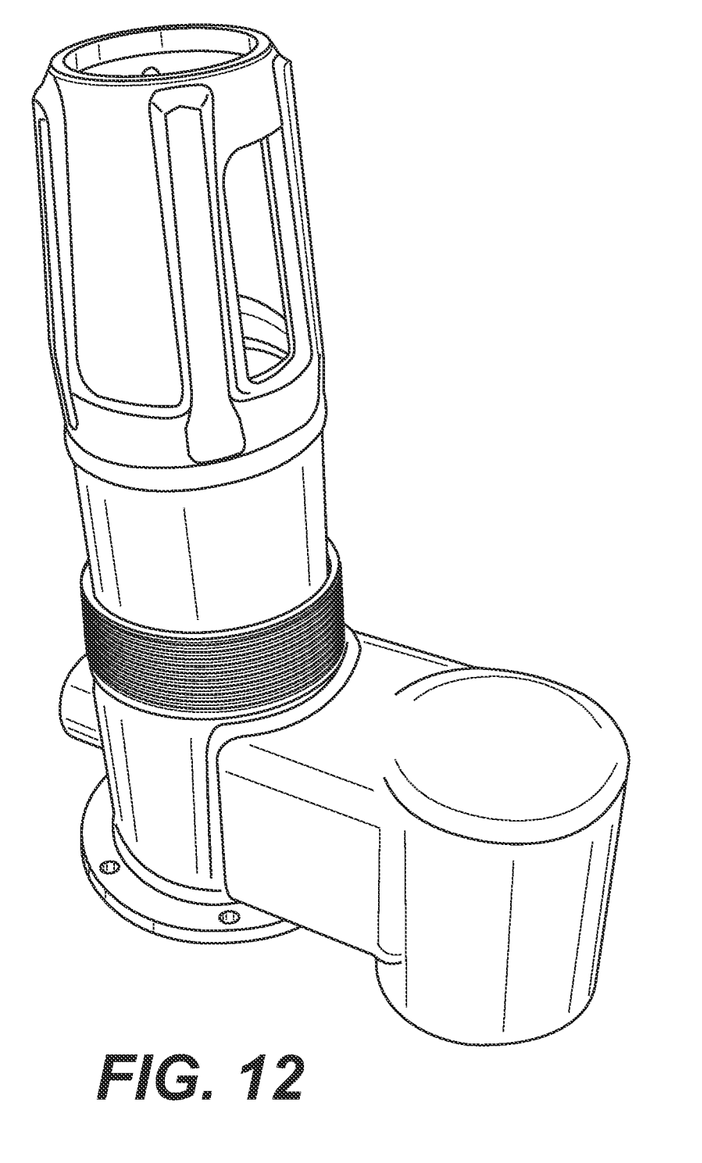
FIG. 12 shows another view of the housing shown in FIG. 10.

As should be appreciated from Appendix A and the attached drawings, the present invention is directed to a valve system. The valve system is designed to be resistant to the effects of low temperatures which otherwise tend to compromise the correct operation of the moving parts of the valve system. The inventor has cleverly got around this problem by designing a valve in which the moving parts thereof are positioned inside the contents of a tank. The contents of the tank ensure that the moving parts are less vulnerable to fluctuations in temperature outside the tank. Consequently, the invention provides reliable valve operation during freezing weather. It should be understood that any and all dimensions shown in the attached Figures are example dimensions only and are not intended to be limiting; that is, the valve system of the invention can have any suitable dimensions.

In one embodiment the valve system is installed into the wall of a fluid storage tank, the valve system being resistant to freezing, comprising: a first portion for shutting off fluid flow; and a second portion operably joined to said first portion; wherein during normal operation of said valve system said first portion is located inside a tank thereby rendering said valve system resistant to freezing, and said second portion includes a turning means for closing and opening said first portion to respectively stop or allow fluid flow. The turning means can be surfaces for the operation of a wrench for opening or shutting the valve system.

It is to be understood that the terms "top", "bottom", "side", "front", "rear", "upper", "lower", "vertical", "horizontal", "height", "width", "length" and the like are used herein merely to describe points of reference and do not limit the present invention to any specific orientation or configuration. The claimed apparatus and components may be of any size, shape or configuration suitable for operation of the apparatus and may be constructed of any suitable materials.

The invention being thus described, it will be evident that the same may be varies in many ways by a routineer in the applicable arts. Such variations are not to be regarded as a departure from the spirit and scope of the invention.

What is claimed is:

1. A valve system for installation into a wall of a fluid storage tank, the valve system being resistant to freezing, comprising:
   a valve body
      having a hollow cylindrical body with a flanged circular opening at one end and a conical frame at an opposite end, said cylindrical body consisting of a first threaded side port and a second, opposite side, threaded elbow port, wherein each of said first threaded side port and second threaded elbow port is configured to connectively receive a corresponding pipe dimensioned to connect to a respective one of said first threaded side port and second threaded elbow port;
   a rotatable valve spool comprising a cross-shaped stem with a conical hood framing one end section thereof, said conical hood conformed to fit inside the conical frame of said valve body, said stem having a main longitudinal shaft and a transverse shaft, wherein a bore extends from one end of said stem, running along the longitudinal axis of said longitudinal shaft until it merges with a cross-bore running the length of said transverse shaft, said cross-bore terminating at each opposite end of said transverse shaft, thereby defining a port at each respective end of said transverse shaft,
   wherein said valve spool is housed inside said valve body by inserting said conical hood of said valve spool into said conical frame of said valve body, such that when said valve spool is seated inside said valve body said valve spool extends from said conical frame of said valve body to said opposite side flanged circular opening of said valve body and a tip of said stem extends beyond said flanged circular opening,
   wherein said stem tip comprises opposite side parallel grooves configured to be grasped by the jaws of a wrench for purposes of twisting said valve spool inside said valve body,
   wherein during normal operation of said valve system the conical frame of the valve body is inserted into a tank, such that about half of the valve body is located inside the tank thereby rendering said valve system resistant to freezing, and the portion of said valve body outside the tank includes the stem tip extending beyond the flanged circular opening of said valve body, whereby said stem tip defines a turning means for rotating said valve spool, such that said rotation causes the ports of said transverse shaft to close and open to respectively stop or allow fluid flow through said transverse shaft bore and into said longitudinal shaft bore.

2. The valve system of claim 1, wherein said rotatable valve spool comprises a circular flange opposite the conical hood, wherein said circular flange mates with the flanged opening of said valve body when said valve spool is inserted in said valve body.

3. The valve system of claim 1, wherein said conical hood of said valve spool comprises at least one opening and said conical frame of said valve body comprises at least one corresponding opening, wherein rotation of said valve spool inside said valve body causes said openings to overlap, such that when said openings overlap fluid may be loaded into said tank from said elbow side port and when said openings do not overlap fluid is prevented from entering said tank from said elbow side port.

* * * * *